United States Patent
Danel et al.

(10) Patent No.: US 8,011,320 B2
(45) Date of Patent: Sep. 6, 2011

(54) ROTARY PRESSURE DISTRIBUTOR AND CAROUSEL-TYPE HOLLOW BODY TREATMENT MACHINE EQUIPPED THEREWITH

(75) Inventors: Laurent Danel, Octeville-Sur-Mer (FR); Marc Mouchelet, Octeville-Sur-Mer (FR)

(73) Assignee: Sidel Participations, Octeville Sur Mer (FR)

( * ) Notice: Subject to any disclaimer, the term of this patent is extended or adjusted under 35 U.S.C. 154(b) by 919 days.

(21) Appl. No.: 11/865,715

(22) Filed: Oct. 1, 2007

(65) Prior Publication Data
US 2008/0078461 A1 Apr. 3, 2008

(30) Foreign Application Priority Data
Oct. 2, 2006 (FR) ...................................... 06 08626

(51) Int. Cl.
*C23C 16/00* (2006.01)
(52) U.S. Cl. .................................................. 118/723 R
(58) Field of Classification Search .................. 118/715, 118/722, 723 R
See application file for complete search history.

(56) References Cited

U.S. PATENT DOCUMENTS

| 5,810,049 A | 9/1998 | Raque et al. |
| 6,818,068 B1 | 11/2004 | Guiffant et al. |
| 6,919,114 B1 | 7/2005 | Darras et al. |

FOREIGN PATENT DOCUMENTS

| BE | 904017 A1 | 5/1986 |
| FR | 2 776 540 B1 | 6/2000 |
| FR | 2791598 A1 | 10/2000 |
| GB | 2169990 A | 7/1986 |
| WO | 2005/025722 A1 | 3/2005 |

*Primary Examiner* — Maureen Gramaglia
(74) *Attorney, Agent, or Firm* — Sughrue Mion, PLLC (57) ABSTRACT

Rotary pressure distributor for a carousel-type hollow-body treatment machine, comprising several treatment stations, this distributor comprising two coaxial rings (2, 3) in sealed contact, one of them (3) a rotary ring comprising communication orifices (6) connected to at least one treatment station and the other (2) stationary and comprising several slots (7) connected to a pressure source of the machine, these orifices and slots being distributed over several concentric circumferences (9) of different diameters; the orifices and/or the slots positioned on the different diameters have anterior and posterior ends (11, 12) shaped in such a way that as the orifices slide past the respective slots, the rates at which the surface area of the passage (13) defined by each orifice and the associated slot increase upon opening and decrease upon closing are substantially the same over all the circumferences.

8 Claims, 5 Drawing Sheets

ROTARY PRESSURE DISTRIBUTOR AND CAROUSEL-TYPE HOLLOW BODY TREATMENT MACHINE EQUIPPED THEREWITH

FIELD OF THE INVENTION

The present invention relates in general to the field of the treatment of hollow bodies, particularly bottles, in several identical treatment stations each intended to process at least one hollow body and in which, for at least one treatment step, the treatment station is placed in communication with a pressure source, particularly a pressure substantially lower than atmospheric pressure, via a sealed rotary distributor.

More specifically, the invention relates to improvements made to rotary pressure distributors for carousel-type hollow-body treatment machines comprising several identical treatment stations each intended to process at least one hollow body, such rotary distributors comprising two coaxial rings, one of them stationary and the other rotary, which are in contact with one another in a sealed fashion via respective facing contact faces defining a meeting plane, the rotary ring comprising communication orifices each able to be connected to at least one treatment station and opening into the contact face of the said rotary ring, said orifices being distributed on several concentric circumferences of different diameters, the stationary ring comprising several slots able to be connected to a pressure source of the machine and opening into the contact face of said stationary ring, said slots being distributed over concentric circumferences of which there are the same number with the same diameters as said orifices so that at least one slot lies in the path of the orifices on each circumference of the rotary ring so that at least one treatment station is placed in communication with the pressure source when the corresponding orifice faces the respective slot.

BACKGROUND OF THE INVENTION

Figures 1, 2:
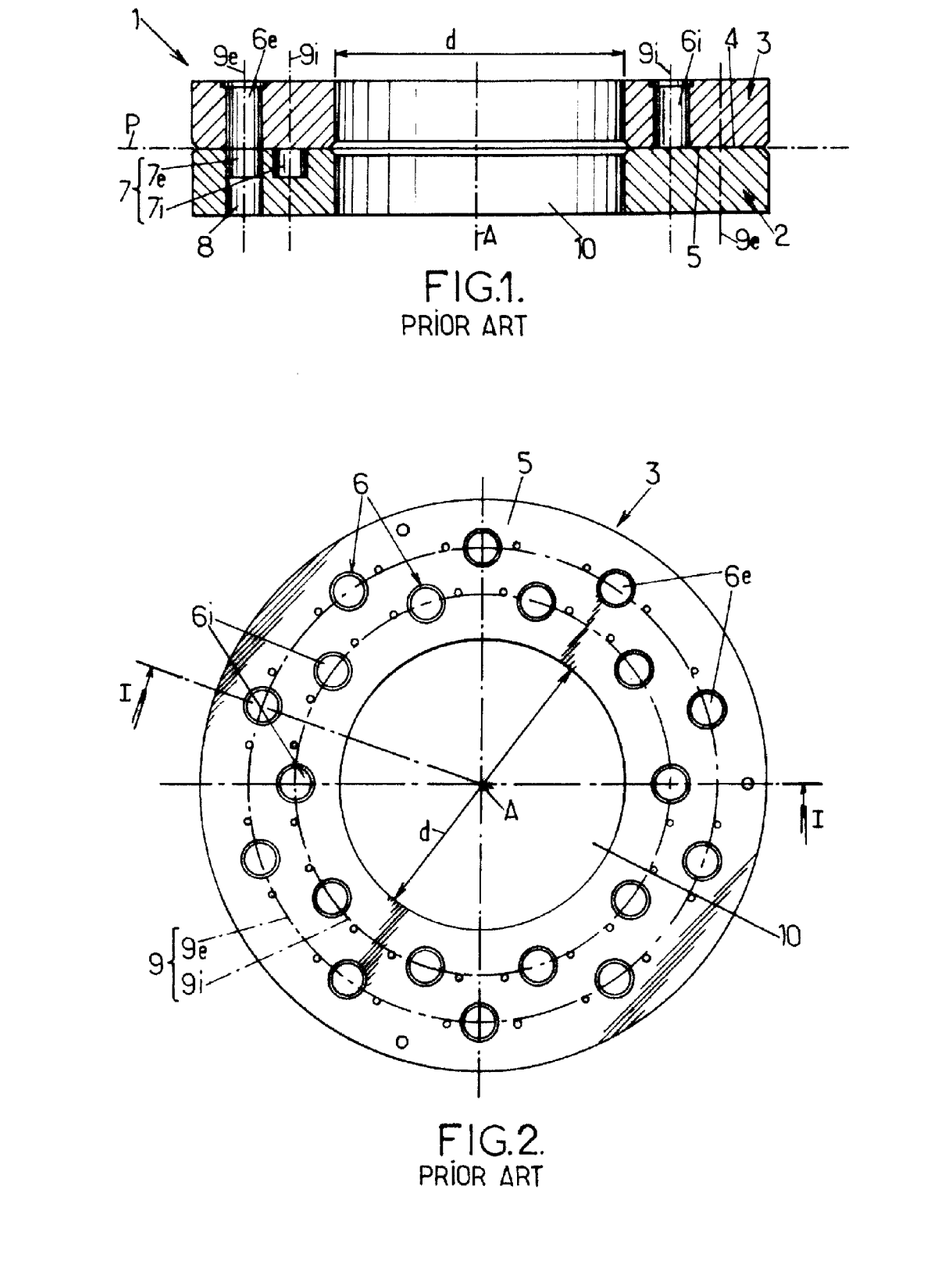
FIG. 1 is a side view, in diametrical section along the line I-I of FIGS. 2 and 3, of a rotary distributor of the prior art as disclosed in document FR 2 791 598 in the name of the Applicant.
FIG. 2 is a view from beneath of the rotary ring of the rotary distributor of FIG. 1.

A rotary distributor of this type is described in document FR 2 791 598 in the name of the Applicant. With reference to FIG. 1 of the attached drawings, the rotary distributor denoted in its entirety by the reference 1, comprises two coaxial rings 2, 3, theoretically with their axis A substantially vertical in the conditions of use as shown in FIG. 1. One of the rings (the ring 2 situated underneath in FIG. 1) is stationary, and the other ring (the ring 3 situated on top in FIG. 1) is rotary. The rings are in contact with one another in a sealed manner via respective facing contact faces 4, 5 defining a meeting plane P. The rotary ring 3 comprises communication orifices, denoted generically by the reference 6, which are each able to be connected to at least one individual treatment station for treating a container and which open into the contact face 5 of said rotary ring 3. The stationary ring 2 comprises at least one slot, denoted generically by the reference 7, which is able to be connected, at 8, to a pressure source of the machine and which opens into the contact face 4 of said stationary ring 2 in such a way as to lie in the path of the orifices 6 in the rotary ring 3; hence, a treatment station is placed in communication with the pressure source when the corresponding orifice 6 lies facing the slot 7.

Figure 3:
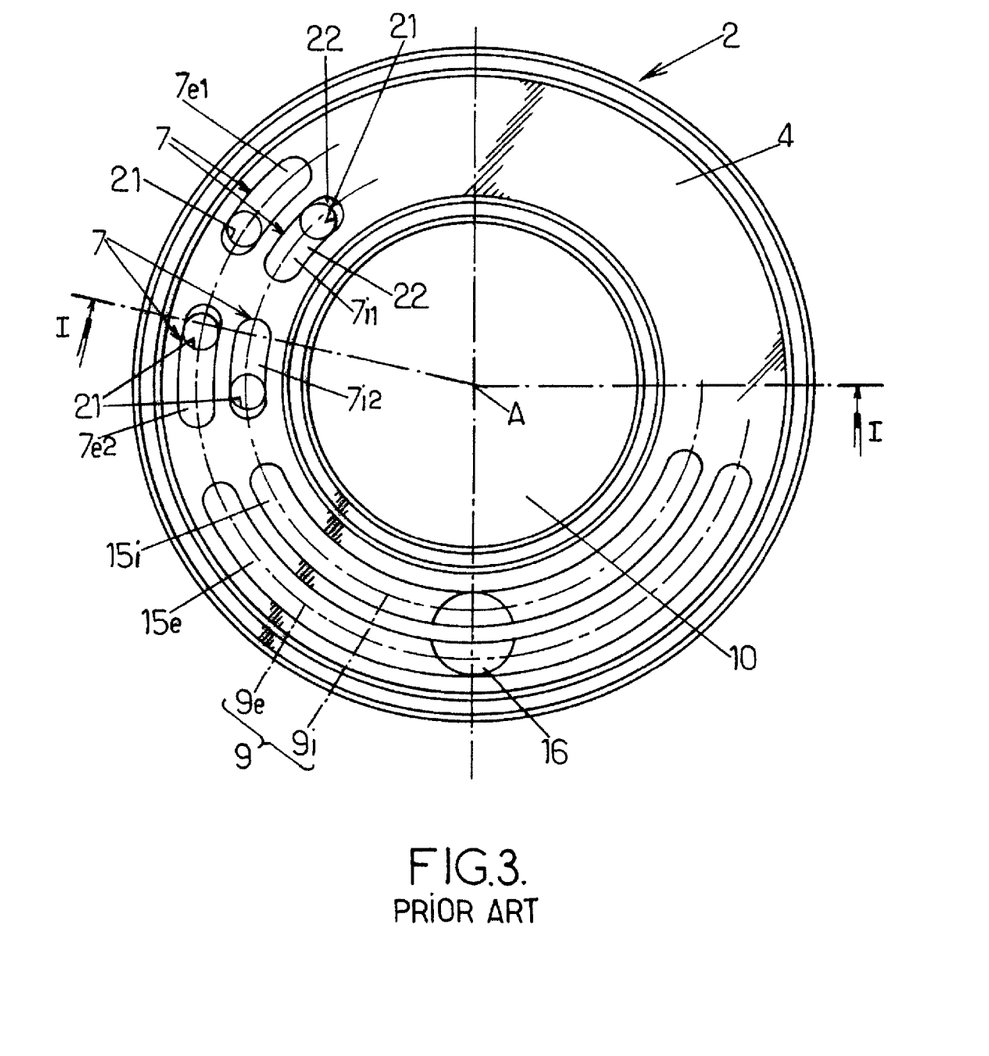
FIG. 3 is a view from above of the stationary ring of the rotary distributor of FIG. 1.

In its design as described and depicted in document FR 2 791 598, the rotary distributor 1 is arranged with orifices 6 for connection to the treatment stations which are distributed over two circumferences, denoted generically by the reference 9, of different diameters (the orifices situated on these two, external 9e and internal 9i, circumferences being denoted 6e, 6i respectively) and with at least two slots 7e, 7i for connecting to at least one pressure source which, too, are situated on two circumferences, also denoted by the references 9e, 9i, of the same diameters as the diameters on which said orifices 6e, 6i are situated. This arrangement can be clearly seen from FIG. 2 of the attached drawings, which is a view of the rotary ring 3 from beneath, and in FIG. 3, which is a view of the stationary ring 2 from above. FIG. 3 shows that the slots 7 are distributed in several groups corresponding to the generation of several pressure levels: two slots $7e_1$, $7i_1$ are connected respectively to pumps involved in a first pumping step (pumping to a first vacuum level); two slots $7e_2$, $7i_2$ are connected respectively to pumps used in a second pumping step (pumping to a second, lower, vacuum level). In addition, two slots 15e, 15i are both connected, via a single common line 16, to a pump used for a vacuum using step (for example depositing a layer of a material such as carbon on a face—particularly the internal face—of a container made of thermoplastic such as PET, using a low-pressure plasma).

In this known arrangement, the radial distance between the two circumferences 9e and 9i is not very high (typically being of the order of magnitude of the diameter of an orifice 6, as can be seen in FIG. 2), whereas the internal circumference 9i is approximately 6 orifice 6 diameters away from the axis A of the rotary distributor.

This known arrangement is currently used in rotary machines that typically have 20 treatment stations, and is entirely satisfactory.

However, container manufacturers, particularly bottle manufacturers, are ever wishing to increase production rates. For certain treatments, (for example, for depositing a barrier layer, particularly of carbon, on the interior face of containers made of thermoplastics such as PET by using a low-pressure plasma), it is not possible to increase to any appreciable extent the rate at which the treatment process is performed at each station. A significant increase in the production rate can therefore be envisaged by increasing the number of treatment stations. Hence, the Applicant Company envisages developing a new machine in which the number of treatment stations is appreciably higher, and typically is more than doubled (to 48 stations).

In terms of the rotary distributor, that may result in a corresponding increase in the number of connections to be made, that is to say typically may correspond to at least doubling the number of communication orifices to be provided in the rotary ring.

However, rotary distributor rings are very large and heavy components; typically, in present-day machines equipped with 20 treatment stations, the rings are approximately 0.60 m in diameter and each weigh of the order of 120 kg. While it still remains possible to increase their outside diameter a little, the capability of the machines needed to manufacture these rings does, however, set a limit that cannot be crossed, even though it would be necessary to cross this limit in order to distribute the increased number of communication orifices over the same number (typically two) of circumferences of different diameters.

In order for the rings to maintain approximately their current diameter, it is therefore necessary to distribute the communication orifices over a larger number (typically 3 or even 4) of circumferences of different diameters. This objective can be achieved by reducing the diameter of the central aperture 10 of the rings 2, 3, and by populating the available surface area of the ring as densely as possible. By way of example, FIG. 4 shows from beneath a rotary ring 3 arranged in a configuration of this type with the orifices 6 distributed over three groups 6e, 6m, 6i situated respectively on three circumferences 9e, 9m, 9i, these respectively being the external, the middle and the internal ones.

Figure 4:
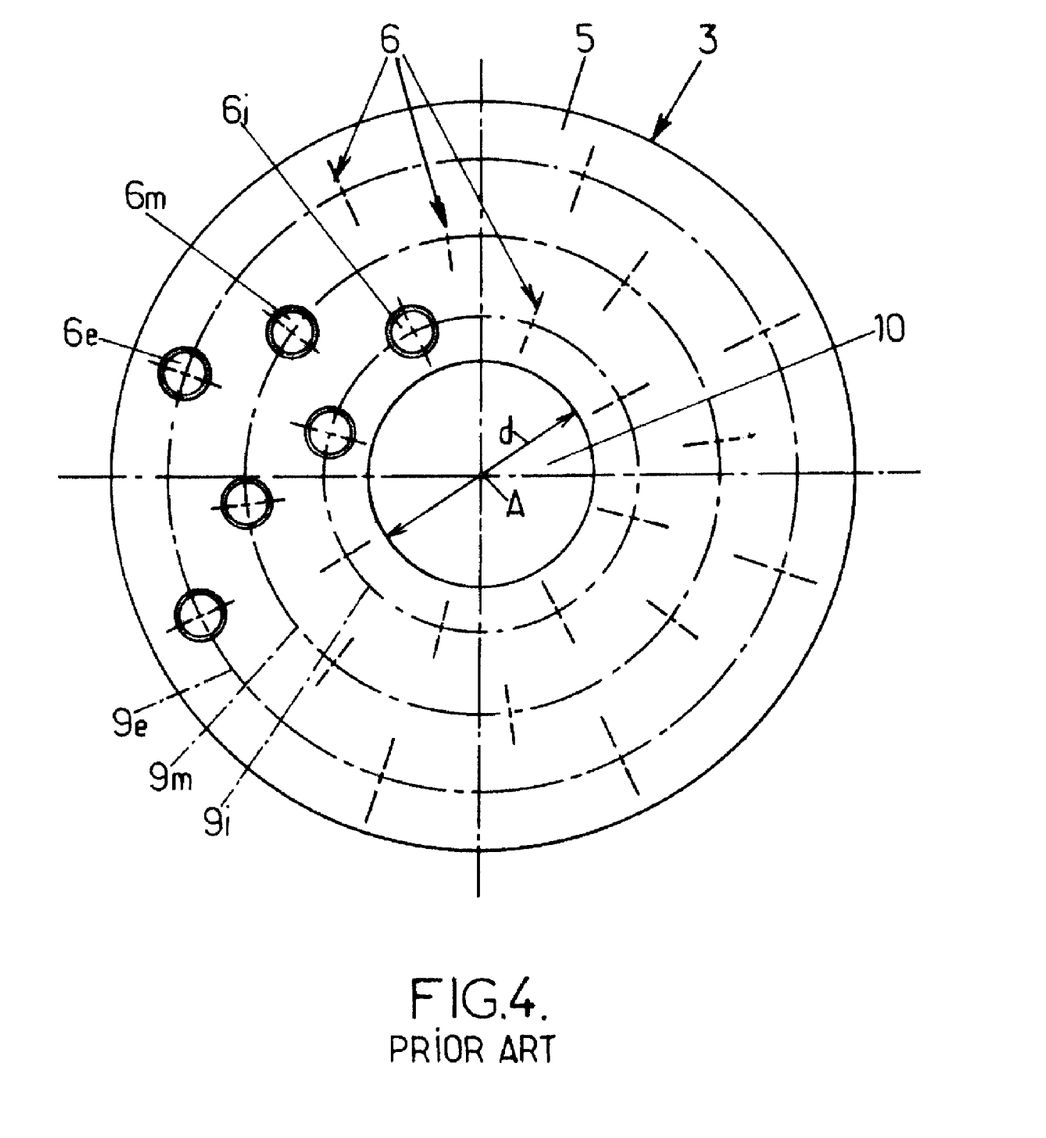
FIG. 4 is a view from beneath of a rotary ring of a rotary distributor modified theoretically for connecting a larger number of treatment stations.

However, in this case, as can be seen in FIG. 4, the diameter of the external circumference 9e is practically twice the diameter of the internal circumference 9i, and the internal circumference 9i is now only about 3 orifice 6 diameters away from the axis A. That means that the linear rate of travel of the orifices 6e situated on the external circumference 9e is practically twice that of the orifices 6i situated on the internal circumference 9i. As a result, if all the orifices 6 have the same shape—here a circle of the same diameter—as illustrated in FIG. 4, the rates at which the passages defined by an orifice 6 coinciding with an associated slot 7 open and close will differ according to the circumference: this rate will be higher for orifices 6e situated on the external circumference than for orifices 6i situated on the internal circumference 9i. This means that the treatment stations do not all receive the pressure in the same way and that, as a result, the containers are not all treated uniformly, according to the position of the control orifice on the rotary distributor.

Such inconsistency in the quality of container treatment is inadmissible.

SUMMARY OF THE INVENTION

It is an object of the invention to propose an improved arrangement of rotary distributor that meets the requirements of present-day practice in terms of the quality of the treatments applied to the containers, without appreciably increasing the external diameter of the rings, without significant structural modifications to the rotary distributor, and without a significant increase in the cost of manufacturing and maintaining the rotary distributor.

To these ends, the invention proposes a rotary pressurised fluid distributor for a carousel-type hollow body treatment machine of the type recited in the preamble and which, being arranged according to the invention, is characterized in that the orifices and/or the slots positioned on the various circumferences have anterior and posterior ends, considered in the direction in which the rotary ring rotates, that are shaped in such a way that, as the orifices slide past the respective slots in the stationary ring, the rates at which the surface area of the passage defined by each orifice and the associated slot increase upon opening and decrease upon closing are substantially the same for all the circumferences.

In a practically preferred embodiment, provision is made for all the orifices and/or the slots to have substantially the same radial dimension and for the anterior and posterior edges, considered in the direction in which the rotary ring rotates, of the orifices and/or of the slots to have radii of curvature that are substantially larger in the case of the orifices and/or slots situated on at least the smallest-diameter circumference, and which are substantially smaller in the case of the orifices and/or slots situated on the largest-diameter circumference. In particular, the anterior and posterior edges of the orifices and/or slots situated on at least the smallest-diameter circumference may advantageously be substantially straight and are directed substantially radially; in particular, the orifices and/or the slots situated on at least the smallest-diameter circumference may be of approximately trapezoidal shape with rounded corners.

For preference, it is desirable to combine one and/or other of the above arrangements with the arrangement whereby the orifices in the rotary ring have substantially the same angular length over all the circumferences and/or whereby the slots in the stationary ring have substantially the same angular length over all the circumferences, so that the length of time for which each station is placed in communication with the pressure source is the same for all the orifices regardless of their location on the rotary ring.

As is clearly evident from the above explanations, a rotary distributor arranged as has just been described in accordance with the invention may find a particularly advantageous application in a carousel-type machine for treating hollow bodies of the type comprising several identical treatment stations able to process at least one hollow body, said machine being equipped with a rotary distributor able, for at least one treatment step, to place each treatment station in turn in communication with at least one pressure source, particularly a source of pressure lower or even very much lower than atmospheric pressure. In a preferred application, this may be a machine for depositing a barrier coating, particularly of carbon, onto the internal face of the hollow bodies, particularly bottles, made of thermoplastic, particularly PET, using a low-pressure plasma, such as the machine described in document FR 2 776 540 in the name of the Applicant, for example.

BRIEF DESCRIPTION OF THE DRAWINGS

The invention will be better understood from reading the description which follows of certain preferred embodiments which are given by way of purely illustrative examples. In this description, reference is made to the attached drawings in which.

DETAILED DESCRIPTION OF THE INVENTION

Figure 5:
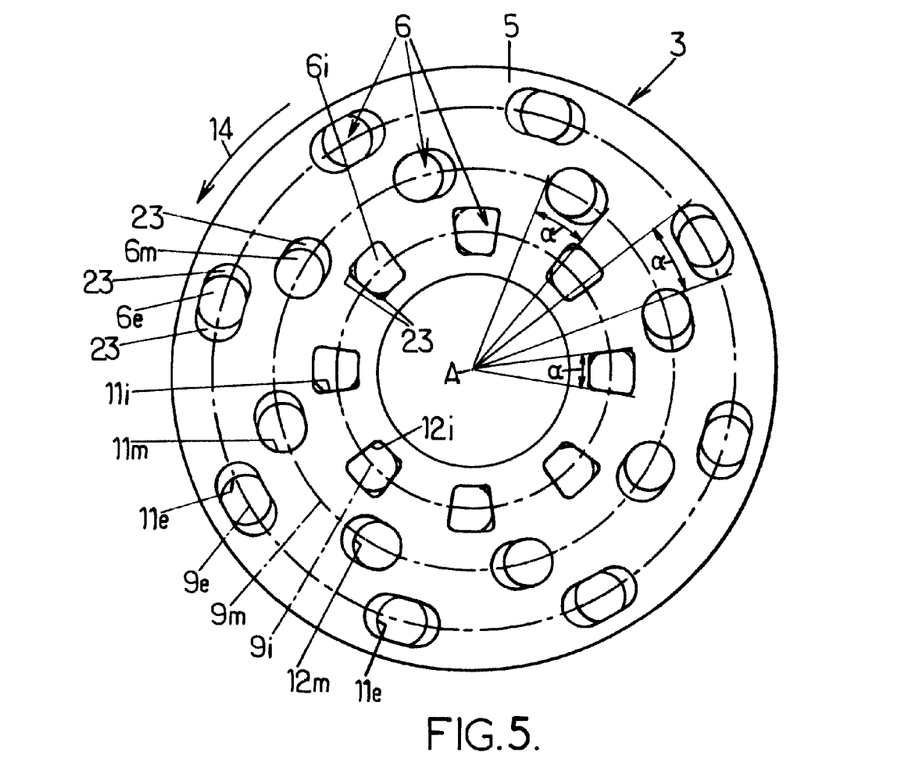
FIG. 5 is a view from beneath of a preferred embodiment of a rotary ring of a rotary distributor arranged according to the invention.
Figure 6:
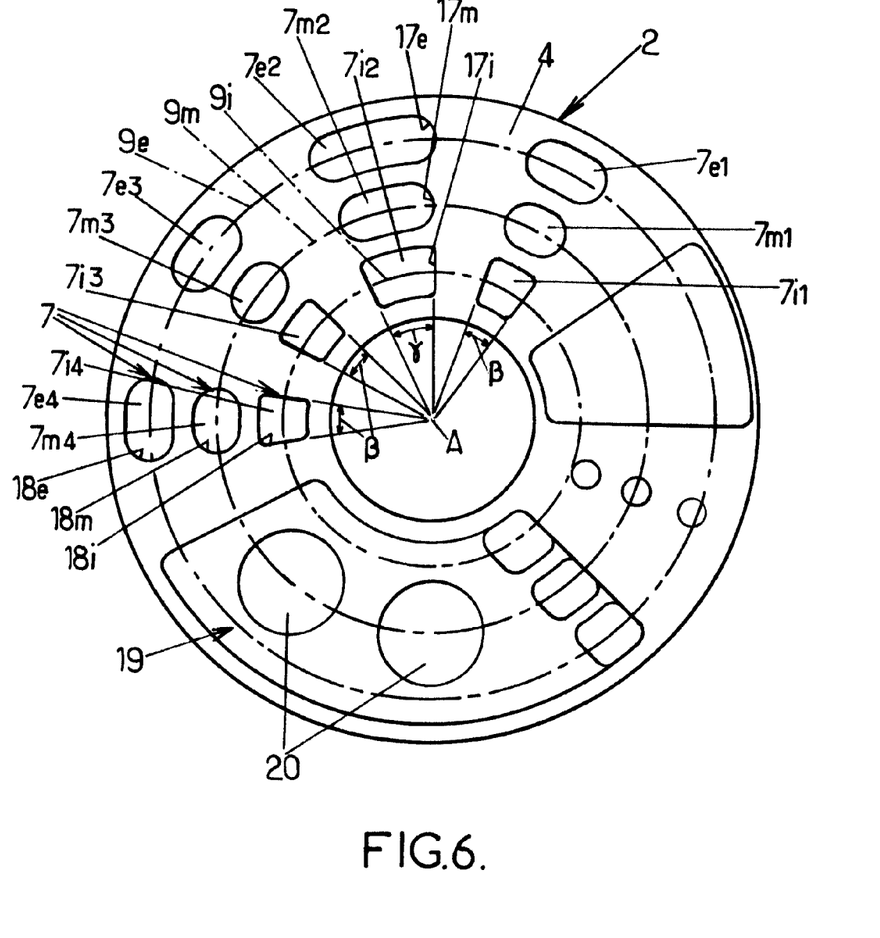
FIG. 6 is a view from above of a preferred embodiment of a stationary ring of a rotary distributor arranged according to the invention.
Figure 7:
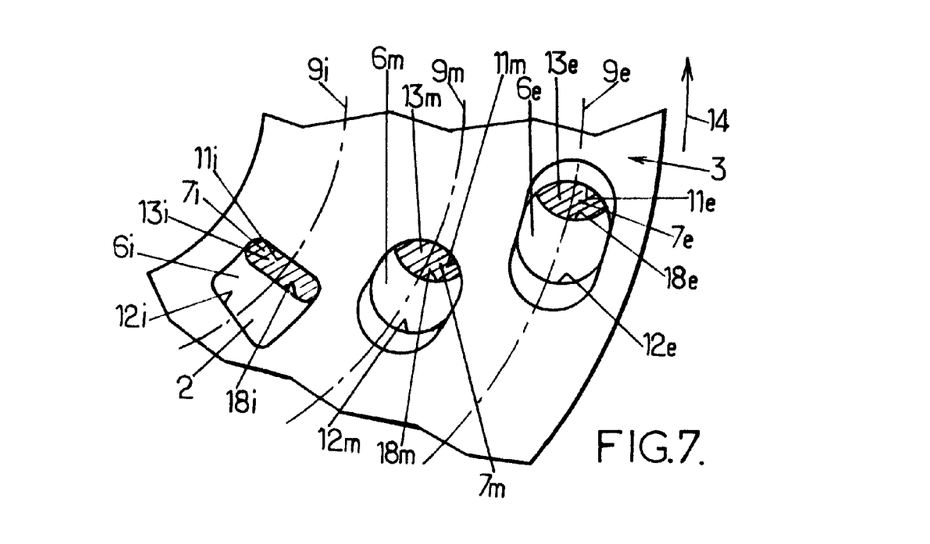
FIG. 7 is a schematic view from above, on a larger scale, illustrating the way in which the arrangements according to the invention work.

Reference will now be made more specifically to FIGS. 5 to 7 in which components or parts similar to those of FIGS. 2 to 4 are denoted by the same numerical references.

As indicated above, the goal on which the invention is founded is that of obtaining identical operating conditions for all work stations of the machine, the fact that the operating conditions are identical being the fact that governs the ability to obtain containers that are all processed identically and are all of the same quality. In particular, having the operating conditions of all the stations of the machine identical entails the pressure being communicated to all the stations in a strictly identical manner and for lengths of time that are equal for all stations, regardless of the radial position of the corresponding passage in the rotary distributor. Now, the respective orifices 6 in the rotary ring 3 have different linear rates of travel according to the circumference on which they are situated, and this linear rate of travel influences the rate at which the passages defined by the orifice 6/slot 7 pairs vary (increasing on opening and decreasing on closure): both passages that are situated on smaller-diameter circumferences open and close more slowly than the passages situated on larger-diameter circumferences. To compensate for the unfavourable influence on the rate of travel of orifices situated on circumferences of different diameters in the rotary ring 3, the elements that define the passages, namely the orifices 6 and/or the slots 7 needs to be shaped appropriately.

There are various technical solutions that can yield an identical rate of variation of the surface area of the passages by adapting the shapes and/or the dimensions of the respective orifices 6 and/or slots 7. However, in an attempt to restrict the number of parts that have to be modified with respect to the prior art, and more specifically in order to modify just one component, namely the rotary ring 3, the invention provides only the orifices 6 in the rotary ring 3 being adapted to suit the desired characteristic, as shown in FIG. 5 to 7. In this context, the slots 7 in the stationary ring 2 all have the same width (radial dimension) and have ends of semicircular shape as is the configuration of the prior art.

Thus, according to the invention and as shown in FIGS. 5 to 7, provision is made for the orifices 6 and/or the slots 7 positioned on the various circumferences 9 to have anterior and posterior ends, considered in the direction (arrow 14) in which the rotary ring 3 rotates, that are shaped in such a way that, as the orifices 6 in the rotary ring 3 slide past the respective slots 7 in the stationary ring 2, the rates at which the surface area of the passage 13 (hatched areas in FIG. 7) defined by each orifice 6 and the associated slot 7 coming into coincidence with one another increase upon opening and decrease upon closing are substantially the same and as high as possible for all the circumferences 9.

Advantageously then, all the orifices 6 have substantially the same radial dimension (width) as they did anyway in the arrangement of the prior art, and this radial dimension is preferably the same as the radial dimension of the slots 7 in the stationary ring 2.

In practice, although reconfiguring just the orifices 6 in the rotary ring 3 or just the slots 7 in the stationary ring 2 can achieve these ends, provision is, however, advantageously made for the orifices 6 and the slots 7 to be reconfigured jointly.

Regarding first of all the rotary ring 3 as shown in FIG. 5 the arrangement according to the invention may consist in the anterior and posterior edges 11, 12, respectively, considered in the direction 14 in which the rotary ring 3 rotates, of the orifices 6 having radii of curvature which are relatively longer in the case of orifices 6i situated on at least the smallest-diameter circumference 9i and relatively shorter in the case of orifices 6e situated on the larger-diameter circumference 9e.

However, on circumferences 9 distant from the axis of rotation A, the differences between the radii of curvature become minimal and may be negligible, which means that the orifices situated on these circumferences can then be given the same radius of curvature. Thus, in the exemplary embodiment shown in FIG. 5, the ends of the orifices 6e and 6m situated on the external 9e and middle 9m circumferences have been given substantially the same radius of curvature, while only the orifices 6i situated on the internal circumference 9i have a different and substantially larger radius of curvature at their ends.

Given the proximity of the internal circumference 9i to the axis A of rotation of the rotary ring 3, a rate of variation of the passages 13i that is substantially identical to the rate of variation of the passages 13e and 13m is obtained by making the anterior and posterior edges 11i, 12i of the orifices 6i situated on the smallest-diameter circumference 9i have a very large radius of curvature so that, given the relatively small radial dimension of these edges, they are therefore substantially straight and directed substantially radially. It is then easy to manufacture the orifices 6i situated on the smaller-diameter circumference 9i with an approximately trapezoidal shape with rounded edges, or even, and for preference, given the relatively small dimensions of their circumferential edges with respect to the diameter of the internal circumference 9i, in an isosceles trapezoidal shape.

The features that have just been explained in relation to the configurations of the orifices according to their radial position on the rotary ring 3 are a compromise for reducing machining costs as far as possible. Specifically, orifices of trapezoidal overall shape with rounded corners can be produced only by milling along an outline using a small-diameter milling cutter; this then is a lengthy and expensive operation. By contrast, producing orifices in the overall shape of a "kidney bean" with rounded edges can be done using a milling cutter of a diameter equal to the width of the orifice, in a single pass; this operation can be performed quickly and simply and is therefore less expensive.

Thus, in the example typically illustrated in FIG. 5, most of the orifices (the orifices 6e, 6m situated on the two circumferences 9e, 9m) can be machined relatively economically, while only the orifices 6i on the internal circumference 9i (namely just one third of the orifices in this example) have to be machined under the more expensive conditions.

Still with a view to defining passages which are all identical independently of their location in the rotary distributor, it is preferable to resort back to an arrangement already employed in rotary distributors of the prior art, whereby the orifices 6 in the rotary ring 3 have substantially the same angular length over all the circumferences 9, resulting in developed lengths that increase in respect of the orifices 6 situated on circumferences 9 of increasing diameter. In FIG. 5, the identical angular dimension α of each of the orifices 6e, 6m and 6i situated on the circumferences 9e, 9m and 9i, respectively, has been denoted α.

Provision may also be made for the orifices 6 to be present in equal numbers on all the circumferences 9 and to be arranged with an angular offset from one another from one circumference to the next circumference, as visible FIG. 5, this arrangement allowing the circumferences 9 to be as close together as possible (the highest possible density of orifices 6 in the face 5 of the ring 3) while at the same time leaving enough space for the respective connectors to be positioned on the external face of the rotary ring 3.

Now regarding the stationary ring 2, as shown in FIG. 6, the slots 7 are arranged in a way similar to the way described above in respect of the orifices 6 in the rotary ring 3. In other words, the slots 7, divided in the example illustrated into four groups denoted by a suffix 1 to 4, corresponding respectively to four pressure levels to be applied to the chambers connected to the orifices 6, are distributed in three series denoted 7e, 7m and 7i, positioned respectively on three circumferences 9e, the external one, 9m in the middle, and 9i on the inside.

The respective anterior and posterior edges 17, 18 of the slots 7 (the anterior edge 17 is the edge collaborating with the anterior edge 11 of a corresponding orifice 6 as a passage 13 opens and the posterior edge 18 being the edge which collaborates with the posterior edge 12 of a corresponding orifice 6 as a passage 13 closes) are shaped the same way as was explained above in respect of the orifices 6, with radii of curvature which are relatively smaller in the case of the slots 7e situated on the external circumference 9e and radii of curvature that are relatively larger in the case of the slots 7*i* situated on the internal circumference 9*i*; typically, in the example illustrated, the slots 7*e* and 7*m* situated respectively on the external circumference 9*e* and the middle circumference 9*m* have anterior edges 17*e*, 17*m* and posterior edges 18*e*, 18*m* of the same radius of curvature, while the slots 7*i* situated on the internal circumference 9*i* have anterior edges 17*i* and posterior edges 18*i* that are substantially straight radially so that the slots 7*i* have a trapezoidal shape with rounded corners, and in particular are of an isosceles trapezoidal shape.

The slots 7 have radial dimensions (widths) equal to the corresponding radial dimensions of the orifices 6; typically, all the slots 7 have the same width, equal to the common width of the orifices 6.

All the slots 7 of the same group (the same number from 1 to 4 in the example of FIG. 6) have the same angular dimension over all the circumferences 9, which means developed lengths that increase for slots 7 situated on circumferences 9 of increasing diameter. In the typical example illustrated in FIG. 6, in order to meet the specific operating requirements, the slots 7 of groups 1, 3 and 4 have substantially the same angular dimension denoted β, while the slots 7 of group 2 are of a larger angular size denoted y.

Looking now at the connection of the orifices 6 to a pump used for a vacuum-operating step (typically for depositing a layer of barrier material on a face—particularly the internal face—of a container made of thermoplastic such as PET, by using a low-pressure plasma), the stationary ring 2 is equipped with a slot 19 which is radially dimensioned to lie facing all the rows of orifices (in this instance, the three rows of orifices 6*e*, 6*m* and 6*i*) and which is in communication with a line 20 (or two lines as illustrated, so as to have an appropriate cross section), connected to this pump. The slot 19 has radially substantially straight anterior and posterior edges and its overall shape is substantially that of a curved trapezoidal shape.

To provide a concrete example, FIG. 7 depicts, in a view from above and on a larger scale, three orifices 6*e*, 6*m* and 6*i* in the rotary ring 3, brought into the same radial alignment, to correspond partially with the slots 7*e*, 7*m* and 7*i* in the stationary ring 2 and defining three respective passages 13*e*, 13*m* and 13*i* (hatched in the drawing) that are in the process of opening (arrow 14). These three passages have substantially the same surface area which varies (increases) at the same rate, which is as high as possible.

In the device of the prior art corresponding to document FR 2 791 598, the stationary ring 2 illustrated in FIG. 3 of the attached drawings is provided with slots 7 of elongate shape as was explained above. These elongate slots 7 are connected to the associated pump via corresponding holes 21 which open into the underside of the stationary ring 2 and to which the connecting lines (not shown) are connected. The holes 21 are of circular cross section. What this means, for each slot, is that blind regions 22 are formed, on one or both sides of the corresponding hole 21.

In the embodiment according to the invention of the rotary ring 3 illustrated in FIG. 5, associated with the opening via which each orifice 6 opens onto the face 5 is a length of bowl forming a crescent-shaped region 23; these crescents may be duplicated and are located one on each side of the corresponding orifice (orifices 6*e* situated on the external circumference 9*e*), may be single and situated on the rear end of the corresponding orifice (orifices 6*m* situated on the middle circumference 9*m*) or may be multiple, and situated in at least some corners of the polygonal orifice (orifices 6*i* situated on the internal circumference 9*i*).

The aforementioned blind regions 22, 23 of the slots or of the orifices constitute areas where lubricant is collected. Once they have become filled with lubricant, these regions are no longer able correctly to perform their functional role. What is more, the presence of these lubricant-filled regions encourages the lubricant to spread into the associated holes and the lines connected to them. It is therefore necessary for these blind regions to be cleaned out regularly, and this entails dismantling the rotary distributor and therefore shutting down the plant, which is detrimental to the operator.

In order to avoid these disadvantages, provision is preferably made for the orifices in the rotary ring and the slots in the stationary ring to pass all the way through, without set-back blind regions. The preferred embodiment of the stationary ring 2 illustrated in FIG. 6 clearly shows this arrangement for all the slots 7. Each slot 7 and each orifice 6 thus has a cross section that is substantially constant through the entire thickness of the respective ring.

As is apparent from all the above explanations, the invention appears to have found a preferred, although not exclusive, application to a carousel-type hollow-body treatment machine of the type comprising several identical treatment stations able to process at least one hollow body, the said machine being equipped with a rotary distributor able, for at least one treatment step, to place each treatment station in turn in communication with at least one pressure source, the rotary distributor of the machine being arranged according to the invention as has just been explained.

An application at which the invention is more specifically aimed in this context is a carousel-type machine as indicated hereinabove which is a machine for depositing a barrier coating, particularly of carbon, onto the internal face of hollow bodies, particularly bottles, made of thermoplastic, particularly PET, using a low-pressure plasma, the rotary distributor then being able to distribute at least one pressure lower, or even very much lower, than atmospheric pressure to each treatment station in turn, in order to generate the plasma required for the aforementioned treatment.

What is claimed is:

1. Rotary pressure distributor for carousel-type hollow-body treatment machines comprising several identical treatment stations each intended to process at least one hollow body, said rotary distributor comprising two coaxial rings, one of them stationary and the other rotary, which are in contact with one another in a sealed fashion via respective facing contact faces defining a meeting plane, the rotary ring comprising communication orifices each able to be connected to at least one treatment station and opening into the contact face of said rotary ring, said orifices being distributed on several concentric circumferences of different diameters, the stationary ring comprising several slots able to be connected to a pressure source of the machine and opening into the contact face of said stationary ring, said slots being distributed over concentric circumferences of which there are the same number with the same diameters as said orifices so that at least one slot lies in the path of the orifices on each circumference of the rotary ring so that a treatment station is placed in communication with the pressure source when the corresponding orifice faces the respective slot, wherein the orifices and/or the slots positioned on the various circumferences have anterior and posterior edges, considered in the direction in which the rotary ring rotates, that are shaped in such a way that, as the orifices slide past the respective slots in the stationary ring, the rates at which the surface area of the passage defined by each orifice and the associated slot increase upon opening and decrease upon closing are substantially the same for all the circumferences, all the orifices and/or the slots have substantially the same radial dimension, and the anterior and posterior edges, considered in the direction in which the rotary ring rotates, of the orifices and/or of the slots have radii of curvature that are substantially larger in the case of the orifices and/or slots situated on at least the smallest-diameter circumference, and which are substantially smaller in the case of the orifices and/or slots situated on the largest-diameter circumference.

2. Rotary distributor according to claim 1, wherein the anterior and posterior edges of the orifices and/or slots situated on at least the smallest-diameter circumference are substantially straight and are directed substantially radially.

3. Rotary distributor according to claim 1, wherein the anterior and posterior edges of the orifices and/or slots situated on at least the smallest-diameter circumference are substantially straight and are directed substantially radially and wherein the orifices and/or slots situated on at least the smallest-diameter circumference are of approximately trapezoidal shape with rounded corners.

4. Rotary distributor according to claim 1, wherein the orifices in the rotary ring have substantially the same angular length over all the circumferences.

5. Rotary distributor according to claim 1, wherein the slots in the stationary ring have substantially the same angular length over all the circumferences.

6. Rotary distributor according to claim 1, wherein all the slots in the stationary ring and all the orifices in the rotary ring pass all the way through.

7. Carousel-type machine for treating hollow bodies, of the type comprising several identical treatment stations able to process at least one hollow body, the said machine being equipped with a rotary distributor able, for at least one treatment step, to place each treatment station in turn in communication with at least one pressure source, wherein the rotary distributor is arranged according to claim 1.

8. Carousel-type machine according to claim 7, which is a machine for depositing a barrier coating onto the internal face of the hollow bodies, made of thermoplastic, using a low-pressure plasma.

* * * * *